(12) United States Patent  (10) Patent No.: US 9,561,950 B1
Chen  (45) Date of Patent: Feb. 7, 2017

(54) OIL SUPPLY UNIT

(71) Applicant: Chin-Chuan Chen, Taichung (TW)

(72) Inventor: Chin-Chuan Chen, Taichung (TW)

( * ) Notice: Subject to any disclaimer, the term of this patent is extended or adjusted under 35 U.S.C. 154(b) by 0 days.

(21) Appl. No.: 14/849,534

(22) Filed: Sep. 9, 2015

(51) Int. Cl.
  *B67D 7/42* (2010.01)
  *B67D 7/04* (2010.01)
  *F16N 37/00* (2006.01)

(52) U.S. Cl.
  CPC . *B67D 7/42* (2013.01); *B67D 7/04* (2013.01); *F16N 37/00* (2013.01); *F16N 2037/006* (2013.01)

(58) Field of Classification Search
  CPC ........ B67C 11/04; B67C 2011/20; B67D 7/42; F16N 37/00
  USPC .......... 141/340–345, 383, 386; 222/567–570
  See application file for complete search history.

(56) References Cited

U.S. PATENT DOCUMENTS

| | | | | |
|---|---|---|---|---|
| 979,807 | A | * 12/1910 | Squires | B67C 11/063 137/426 |
| 4,031,032 | A | * 6/1977 | Jablecki | B01D 17/0208 141/344 |
| 4,559,984 | A | * 12/1985 | Wycech | B67C 11/00 141/340 |
| 5,607,004 | A | * 3/1997 | Cope | B67C 11/00 141/331 |

* cited by examiner

*Primary Examiner* — Timothy L Maust
*Assistant Examiner* — Timothy P Kelly
(74) *Attorney, Agent, or Firm* — Guice Patents PLLC

(57) ABSTRACT

An oil supply unit includes a reservoir connected to an outlet tube. A base has a recessed area defined in the top thereof, and a tubular portion extends from the bottom of the base. The recessed area has a passage which communicates with the tubular portion. The outlet tube extends through the passage and the tubular portion. A securing unit extends through the base and located corresponding to the tubular portion. The securing unit is movable relative to the outlet tube. A board is connected to the base and has a pass hole through which the outlet tube extends. Two springs are biased between one end of the board and one of inside walls of the recessed area. An object is clamped between the base and the securing unit such that the oil supply unit is stably and securely supply oil to a vehicle.

8 Claims, 10 Drawing Sheets

OIL SUPPLY UNIT

BACKGROUND OF THE INVENTION

1. Fields of the Invention

The present invention relates to an oil supply unit, and more particularly, to an oil supply unit with stable connection to easily and effectively supply oil to vehicles.

2. Descriptions of Related Art

The conventional oil supply unit 10 is disclosed in FIGS. 7 and 8, and used to supply new clutch oil or brake oil for vehicles, in order to prevent air from entering the clutch oil container or the brake oil container, the new oil has to be poured into the container while the used oil is drained out. The conventional oil supply unit 10 has a reservoir 101, an outlet tube 102, a base 103 and a securing member 104. The outlet tube 102 has one end connected to the reservoir 101, and the other end extends through the tubular portion 106 on the base 103 and the securing member 104 which is biased to the base 103. A securing member 105 extends through the base 103 so as to clamp an object between the base 103 and the tubular portion 106. A valve 107 is connected to the outlet tube 102 so as to control the communication between the outlet tube 102 and the reservoir 101. After the outlet tube 102 extends through the tubular portion 106, the outlet tube 102 is secured by the securing member 104. However, there is no securing or positioning device located between the tubular portion 106 and the outlet tube 102 so that when operation, the outlet tube 102 is rotatable relative to the tubular portion 106. Therefore, when operating the valve 107, the reservoir 101 may be rotated with the outlet tube 102, and leakage can happen and the operation may be stopped. Besides, as shown in FIGS. 9A and 9B, the valve 107 has a groove 108 for receiving a seal 109 therein to prevent leakage between the reservoir 101 and the outlet tube 102 after the valve 107 is turned off. However, if the depth of the groove 108 is too deep, the seal 109 has not function, if the depth of the groove 108 is too shallow, the seal 109 may be dragged out from the groove 108 when operating the valve 107.

The present invention intends to provide an oil supply unit to eliminate the shortcomings mentioned above.

SUMMARY OF THE INVENTION

The present invention relates to an oil supply unit and comprises a reservoir and an outlet tube which is connected to an outlet of the reservoir. A base has a recessed area defined in the top thereof. A tubular portion extends from the bottom of the base and is located corresponding to the recessed area. The recessed area has a passage which communicates with the tubular portion. The outlet tube extends through the passage and the tubular portion. The base is movably relative to the outlet tube. A securing unit extends through the base and located corresponding to the tubular portion. The securing unit is movable relative to the outlet tube. A board is connected to the base and has a pass hole through which the outlet tube extends. At least one spring is biased between the first end of the board and one of inside walls of the recessed area.

Preferably, the recessed area has an opening defined through another one of the inside walls of the recessed area so as to form two stop located at two ends of the opening. The board is located in the recessed area and has two recesses defined in two sides thereof. The two stops are movably engaged with the two recesses of the board so as to restrict the board from passing through the opening. A press end extends from the second end of the board and protrudes beyond the opening. The board is movable in the recessed area by pressing the press end toward the recessed area.

Preferably, an extension portion extends from one end of the base and is parallel to the outlet tube. The extension portion has a threaded hole. The securing unit has a clamp member and a threaded rod. The clamp member is located between the tubular portion and the extension portion. The threaded rod threadedly extends through the threaded hole and is pivotably connected to the clamp member. A head is connected to the distal end of the threaded rod and located on outside of the extension portion. A distance between the clamp member and the tubular portion is adjusted by rotating the head.

Preferably, a connection tube is transversely connected to the outlet tube and has an axial recess and a radial hole. The radial hole communicates with the reservoir and the outlet tube. A valve is rotatably inserted in the axial recess and has a connection hole and a dent defined in the outer periphery thereof. A pad is resiliently located in the dent. When the connection hole is moved to a position to communicate with the radial hole, the reservoir 11 communicates with the outlet tube via the valve. When the pad is moved to a position to face the radial hole, the reservoir is shut off from the outlet tube.

Preferably, the pad is a circular pad and has two studs on the inner side thereof. The dent has two circular holes in which the two studs are inserted.

Preferably, the outer periphery of the connection section of the outlet tube has multiple ridges and grooves defined alternatively to each other. A flange extends inward from the inner periphery of the pass hole of the board. The flange is engaged with the grooves.

Preferably, the recessed area has multiple notches. A cover is mounted to the recessed area and has a circular hole through which the outlet tube extends. The cover has multiple ribs which are engaged with the notches.

The primary object of the present invention is to provide an oil supply unit wherein the reservoir of the oil supply unit is stable and does not shake so that the supply of new oil to the vehicles is effectively. The pad is resiliently located in the dent to prevent the pad from dropping off from the valve when the valve is rotated, thereby having better sealing feature to the reservoir and the outlet tube.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
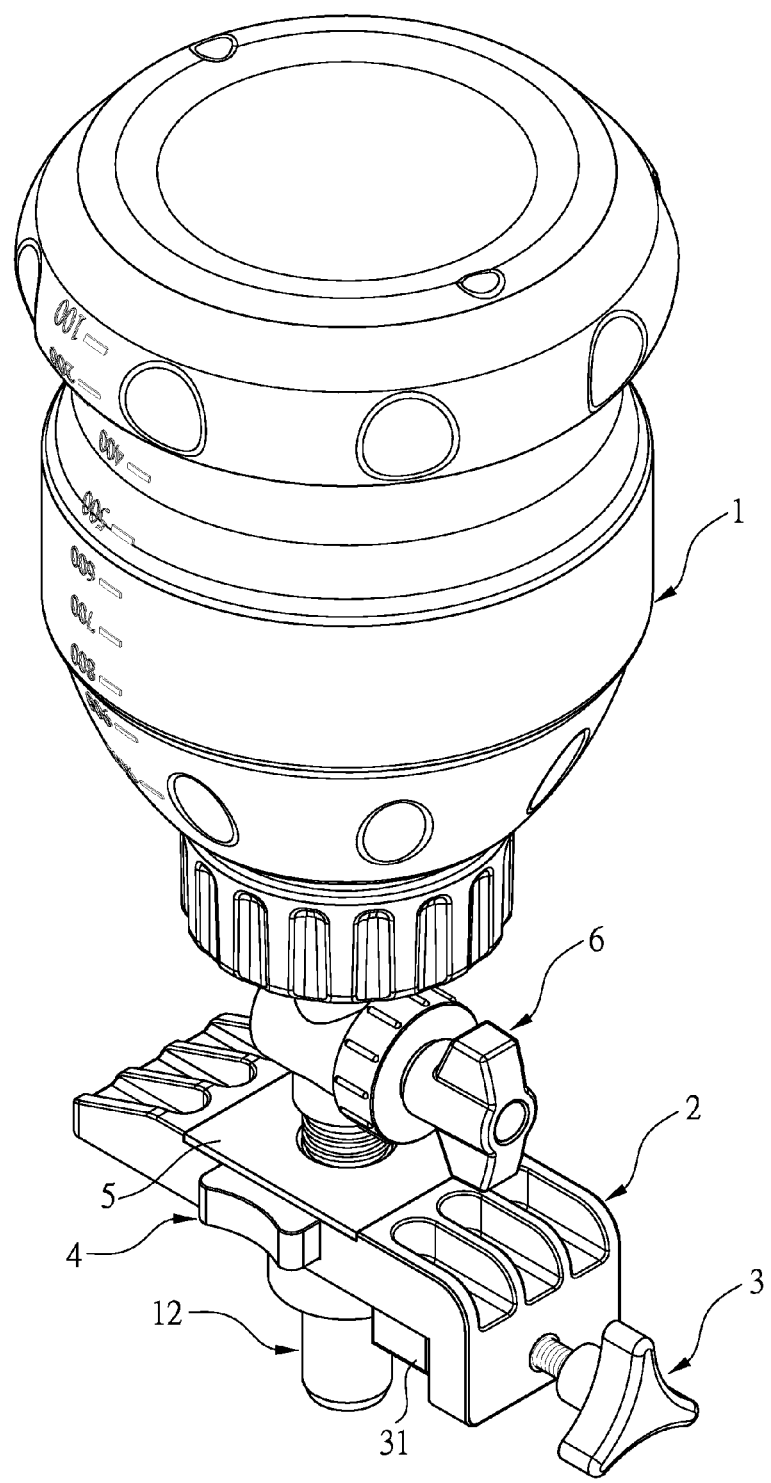
FIG. 1 is a perspective view to show the oil supply unit of the present invention.
Figure 2:
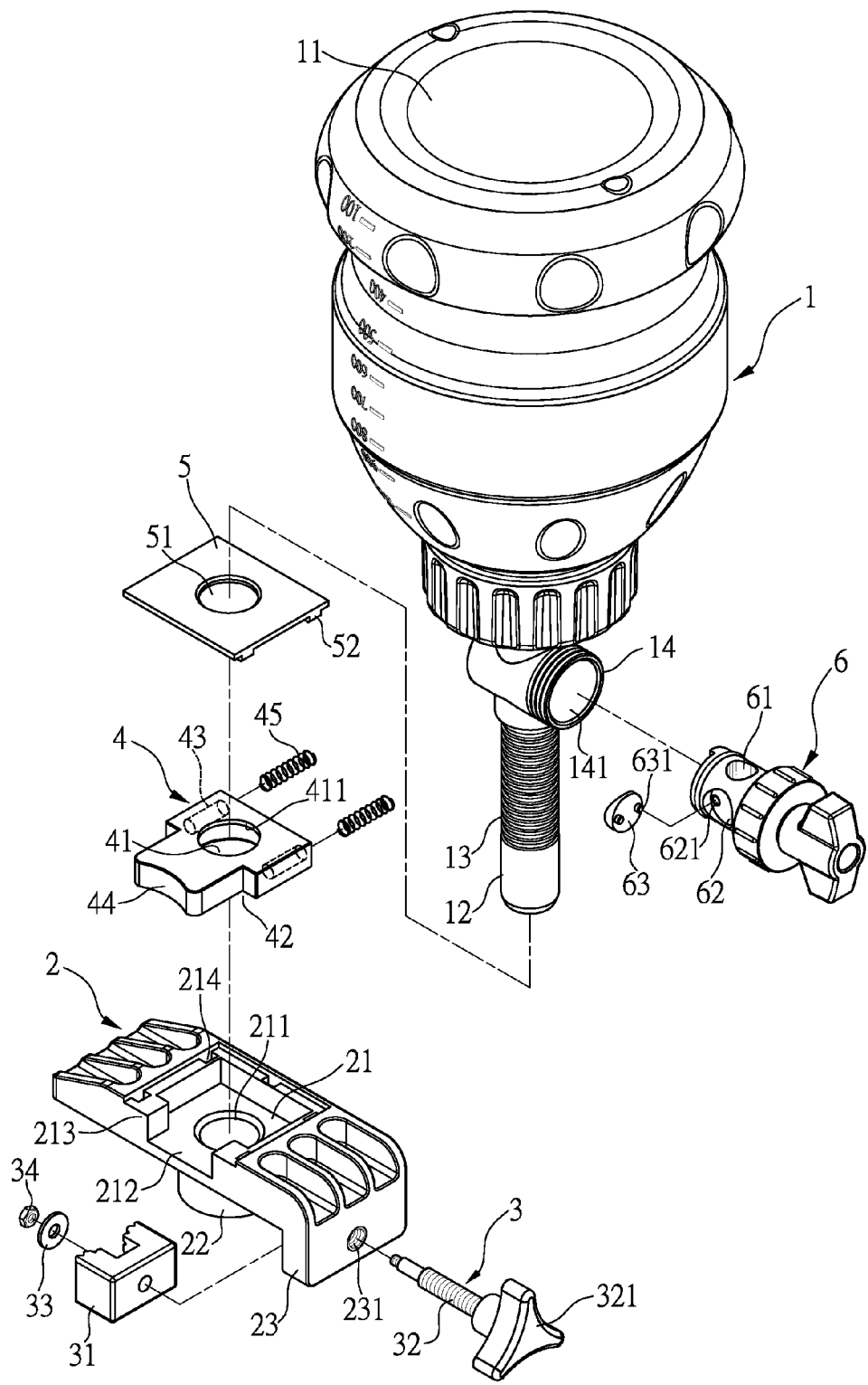
FIG. 2 is an exploded view of the oil supply unit of the present invention.

Referring to FIGS. 1 to 4, the oil supply unit 1 of the present invention comprises a reservoir 11 and an outlet tube 12 which has one end connected to the outlet 111 of the reservoir 11. The outlet tube 12 has a connection section 13. The outer periphery of the connection section 13 of the outlet tube 12 has multiple ridges 131 and grooves 132 defined alternatively to each other. A base 2 has a recessed area 21 defined in the top thereof, and a tubular portion 22 extends from the bottom of the base 2 and is located corresponding to the recessed area 21. The recessed area 21 has a passage 211 which communicates with the tubular portion 22. The outlet tube 12 extends through the passage 211 and the tubular portion 22. The base 2 is able to be movable relative to the outlet tube 12. A securing unit 3 extends through the base 2 and is located corresponding to the tubular portion 22. The securing unit 3 is movable relative to the outlet tube 22. Further referring to FIG. 5A, a board 4 is connected to the base 2 and has a pass hole 41 through which the outlet tube 12 extends. Two springs 45 are biased between the first end of the board 4 and one of inside walls of the recessed area 21. The first end of the board 4 has two reception holes 43 so as to receive the two springs 45. The recessed area 21 has an opening 212 defined through another one of the inside walls of the recessed area 21 so as to form two stops 213 located at two ends of the opening 212. The board 4 is located in the recessed area 21 and has two recesses 42 defined in two sides thereof. The two stops 213 are movably engaged with the two recesses 42 of the board 4 so as to restrict the board 4 from passing through the opening 212. A press end 44 extends from the second end of the board 4 and protrudes beyond the opening 212. A flange 411 extends inward from the inner periphery of the pass hole 41 of the board 4, the flange 411 is engaged with the grooves 132 when the springs 45 are not compressed so that the outlet tube 12 is held by the engagement between the flange 411 and the grooves 132 of the connection section 13 of the outlet tube 12.

Figure 5A:
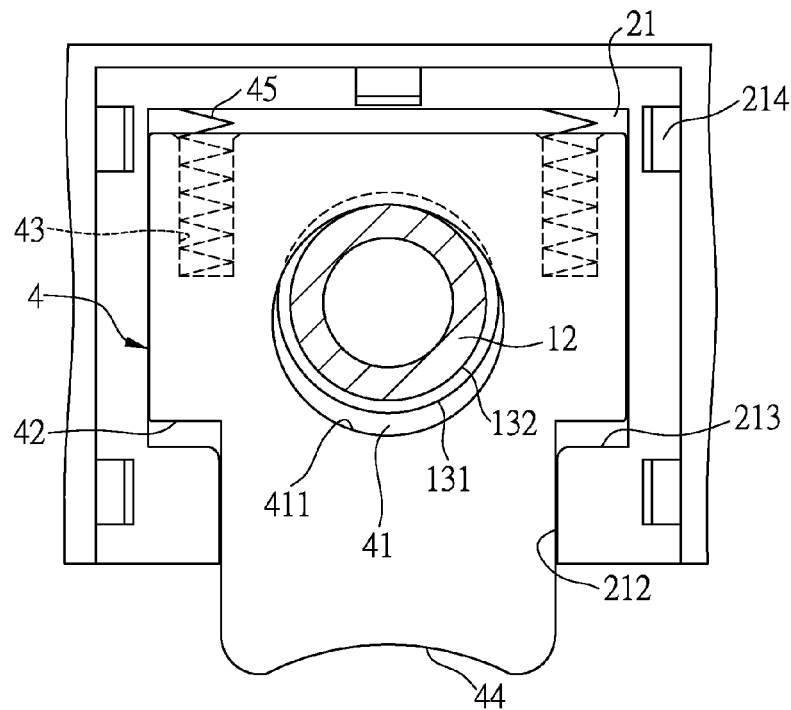
FIG. 5A shows that the board holds the outlet tube.
Figure 5B:
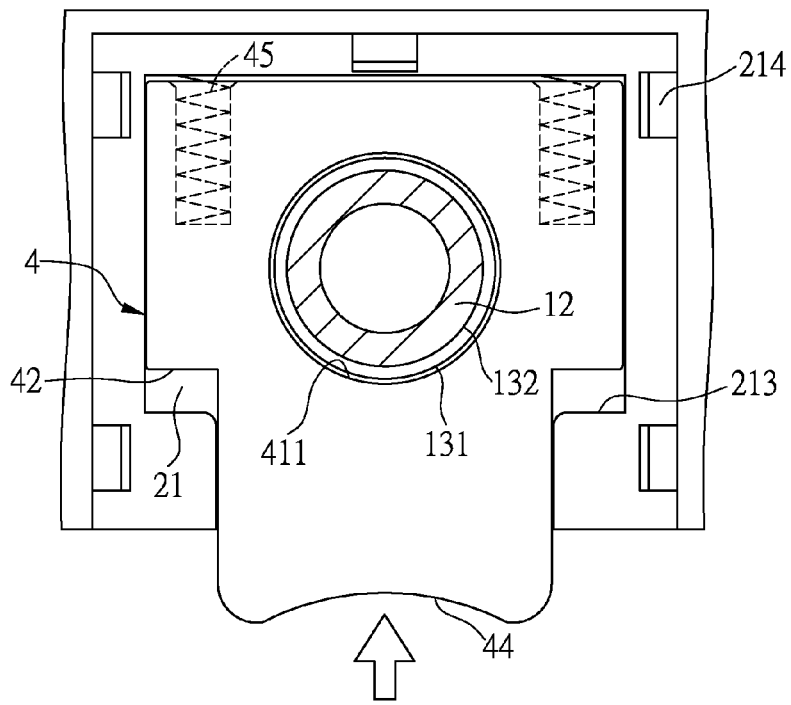
FIG. 5B shows that the board is pushed and releases the holding to the outlet tube.
Figure 6A:
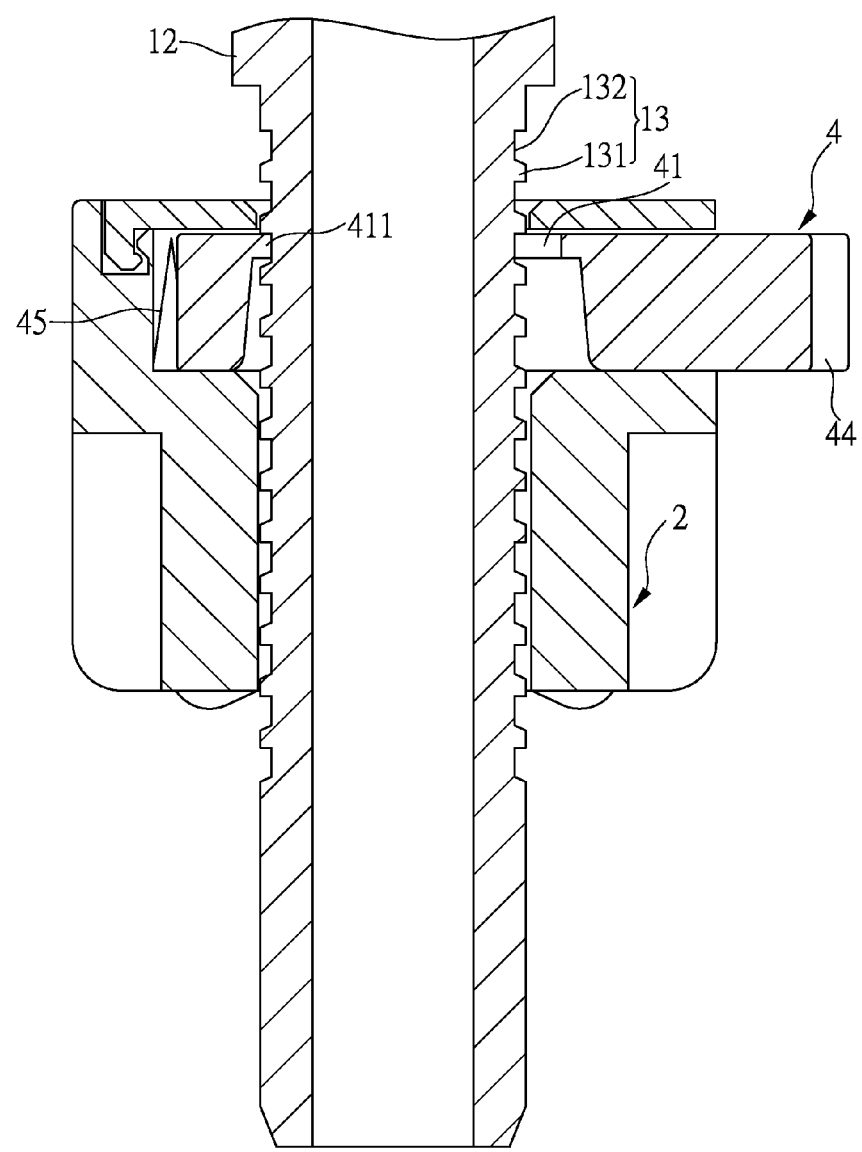
FIG. 6A is a cross sectional view to show that the flange of the board is engaged with the grooves of the outlet tube.
Figure 6B:
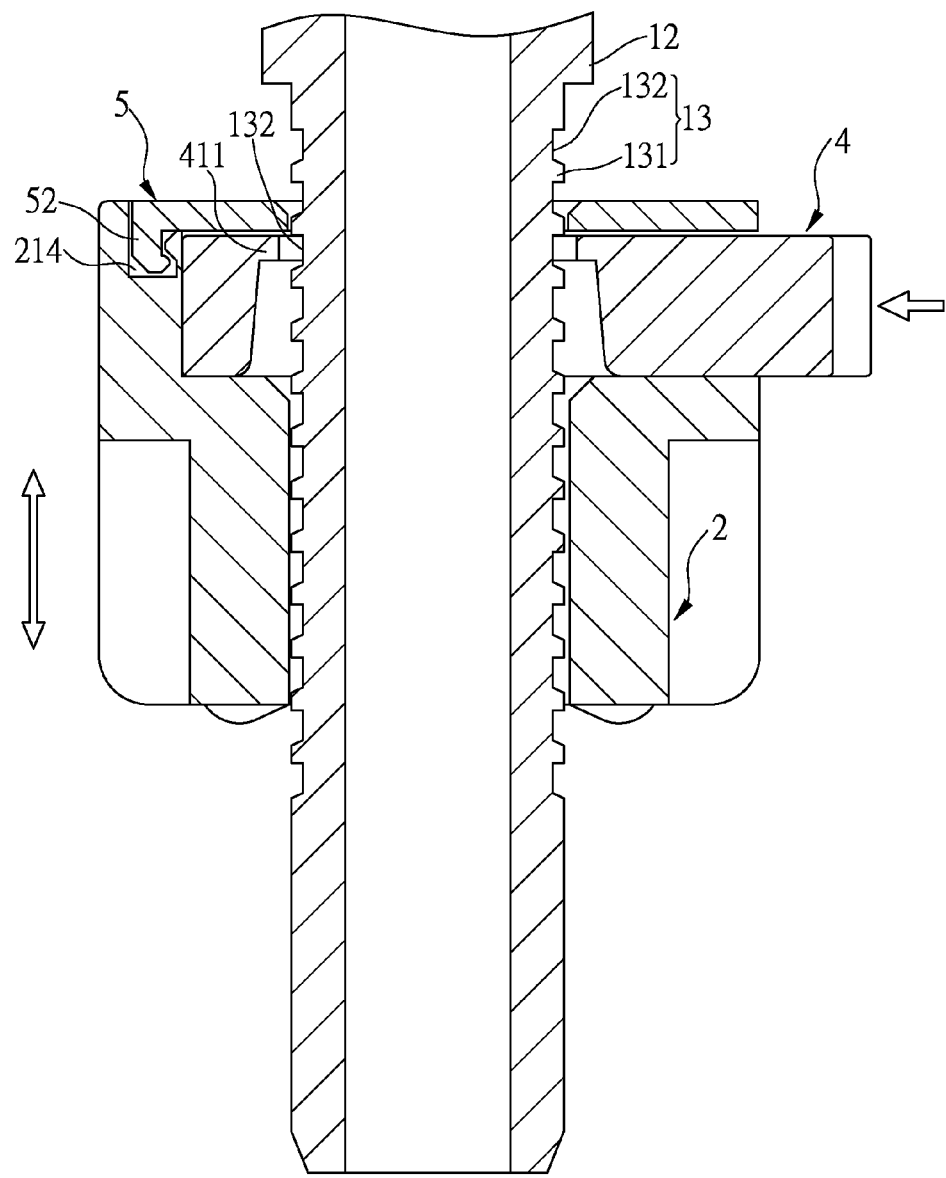
FIG. 6B is a cross sectional view to show that the flange of the board is disengaged from the grooves of the outlet tube.
Figure 7:
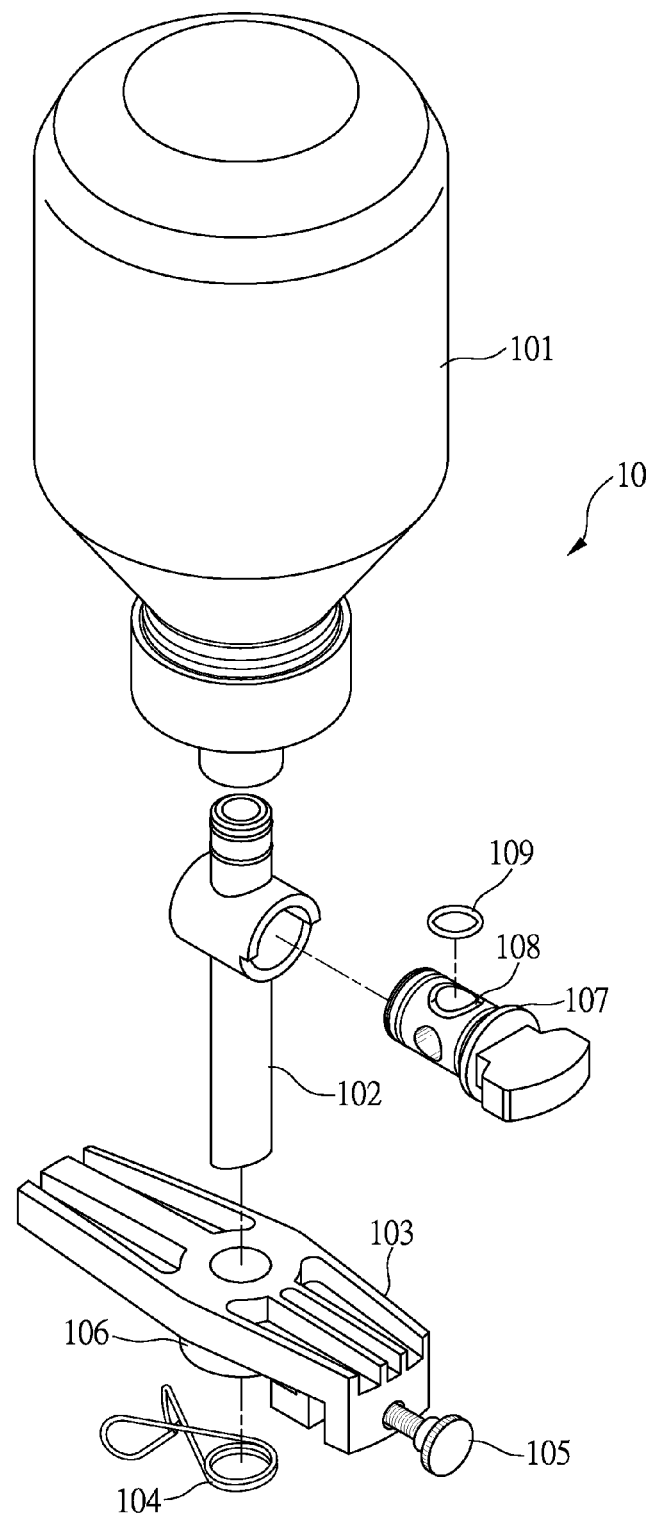
FIG. 7 is an exploded view of the conventional oil supply unit.
Figure 8:
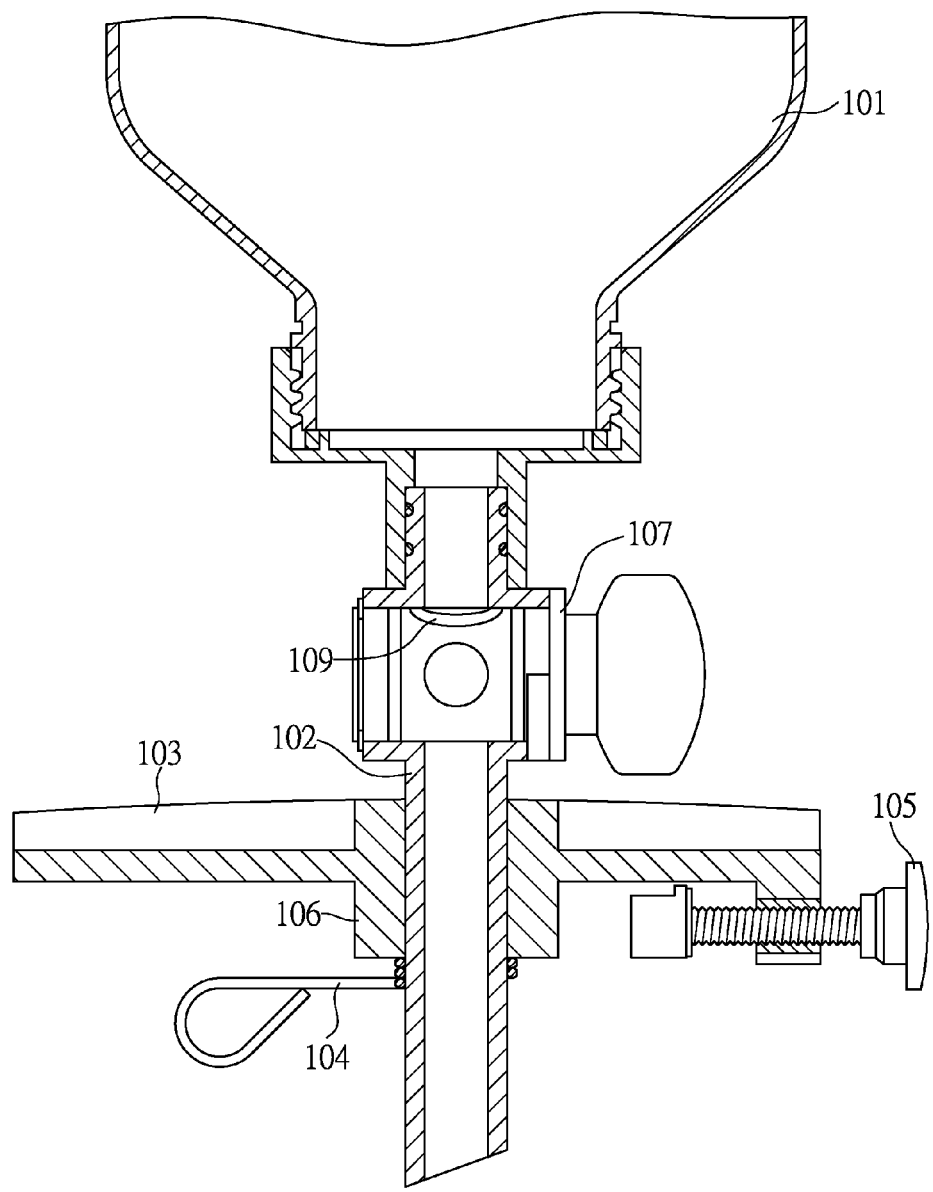
FIG. 8 is a cross sectional view of the conventional oil supply unit.
Figure 9A:
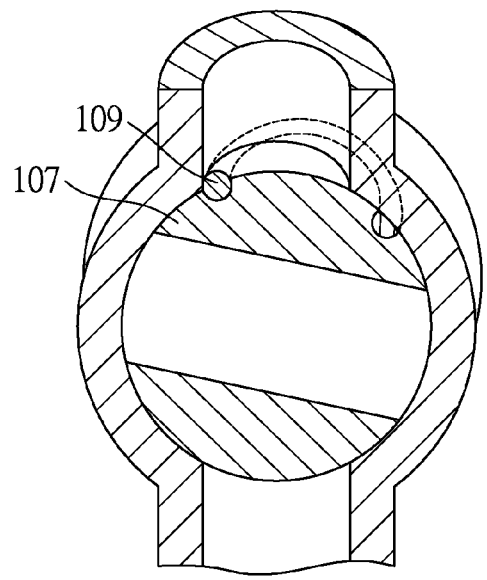
FIGS. 9A and 9B show that the seal of the valve is dragged out.
Figure 9B:
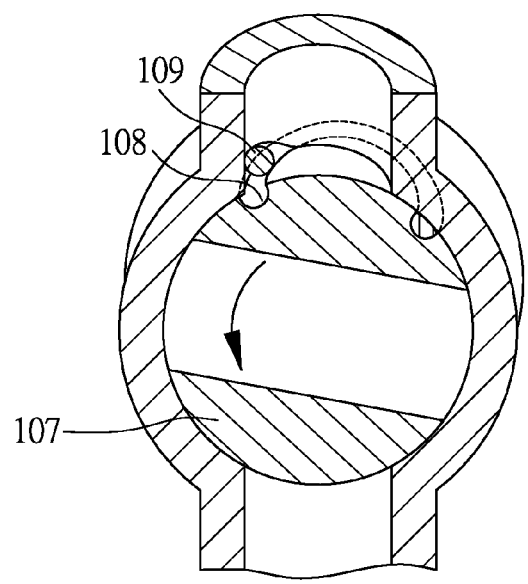

The board 4 is movable in the recessed area 21 by pressing the press end 44 toward the recessed area 21. As shown in FIG. 5B, when pressing the press end 44 toward the recessed area 21, the springs 45 are compressed, and the board 4 is moved so that the flange 411 is disengaged from the grooves 132 of the connection section 13 such that the outlet tube 12 is released. An object 9 is clamped or secured by the securing unit 3 and the base 2 to stably position the oil supply unit 1.

The recessed area 21 has multiple notches 214. A cover 5 is mounted to the recessed area 21 and has a circular hole 51 through which the outlet tube 12 extends. The cover 5 has multiple ribs 52 which are engaged with the notches 214. The board 4 and the springs 45 are then restricted from dropping from the recessed area 21.

An extension portion 23 extends from one end of the base 2 and is parallel to the outlet tube 12. The extension portion 23 has a threaded hole 231. The securing unit 3 has a clamp member 31 and a threaded rod 32. The clamp member 31 is located between the tubular portion 22 and the extension portion 23. The threaded rod 32 threadedly extends through the threaded hole 231 and is pivotably connected to the clamp member 31. A washer 33 and a nut 34 are cooperated with the first end of the threaded rod 32. A head 321 is connected to a the second end of the threaded rod 32 and located on outside of the extension portion 23. The distance between the clamp member 31 and the tubular portion 22 is adjusted by rotating the head 321.

Figure 3:
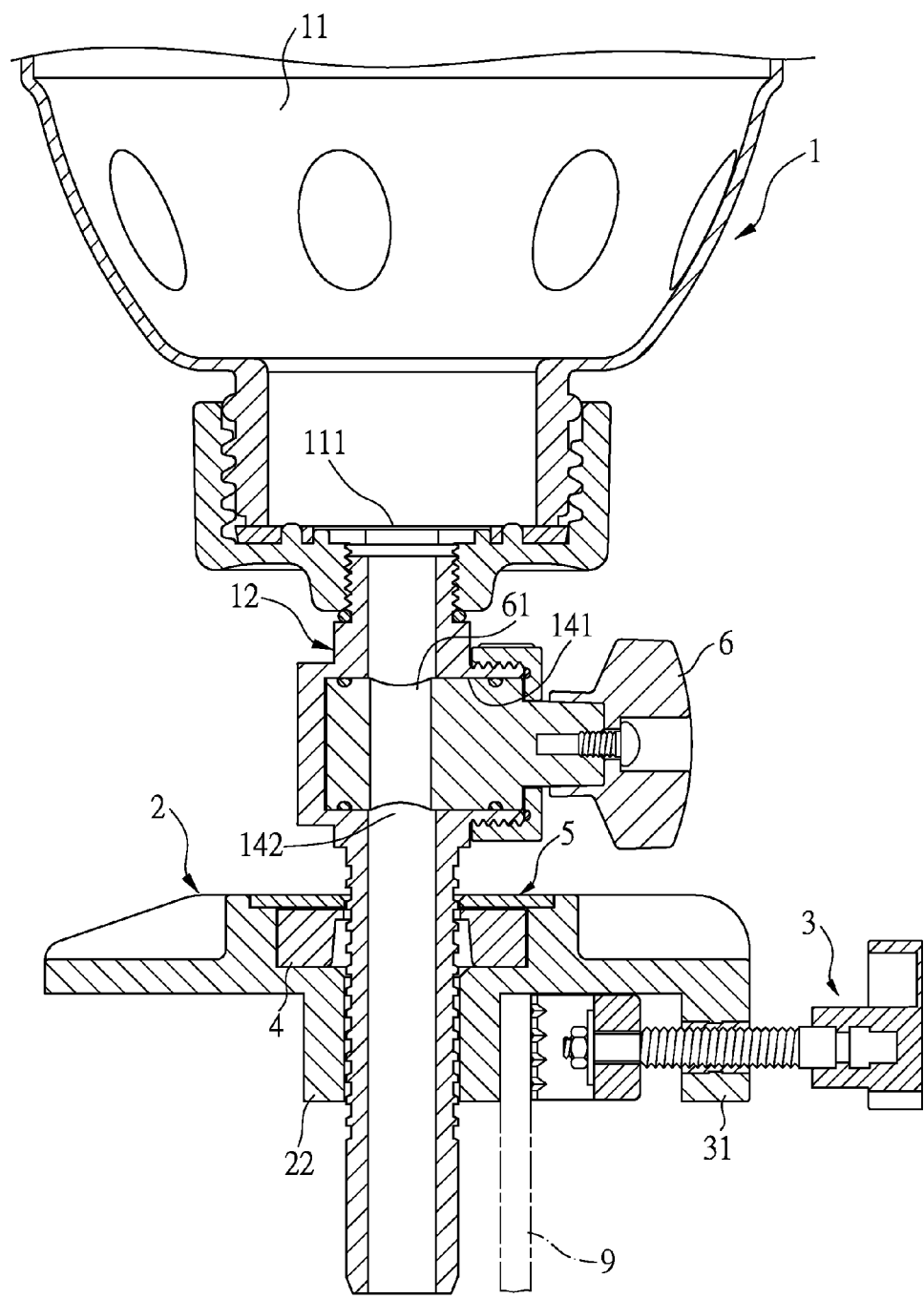
FIG. 3 is a cross sectional view of the oil supply unit of the present invention, wherein the valve is rotated to communicate with the reservoir and the outlet tube.
Figure 4:
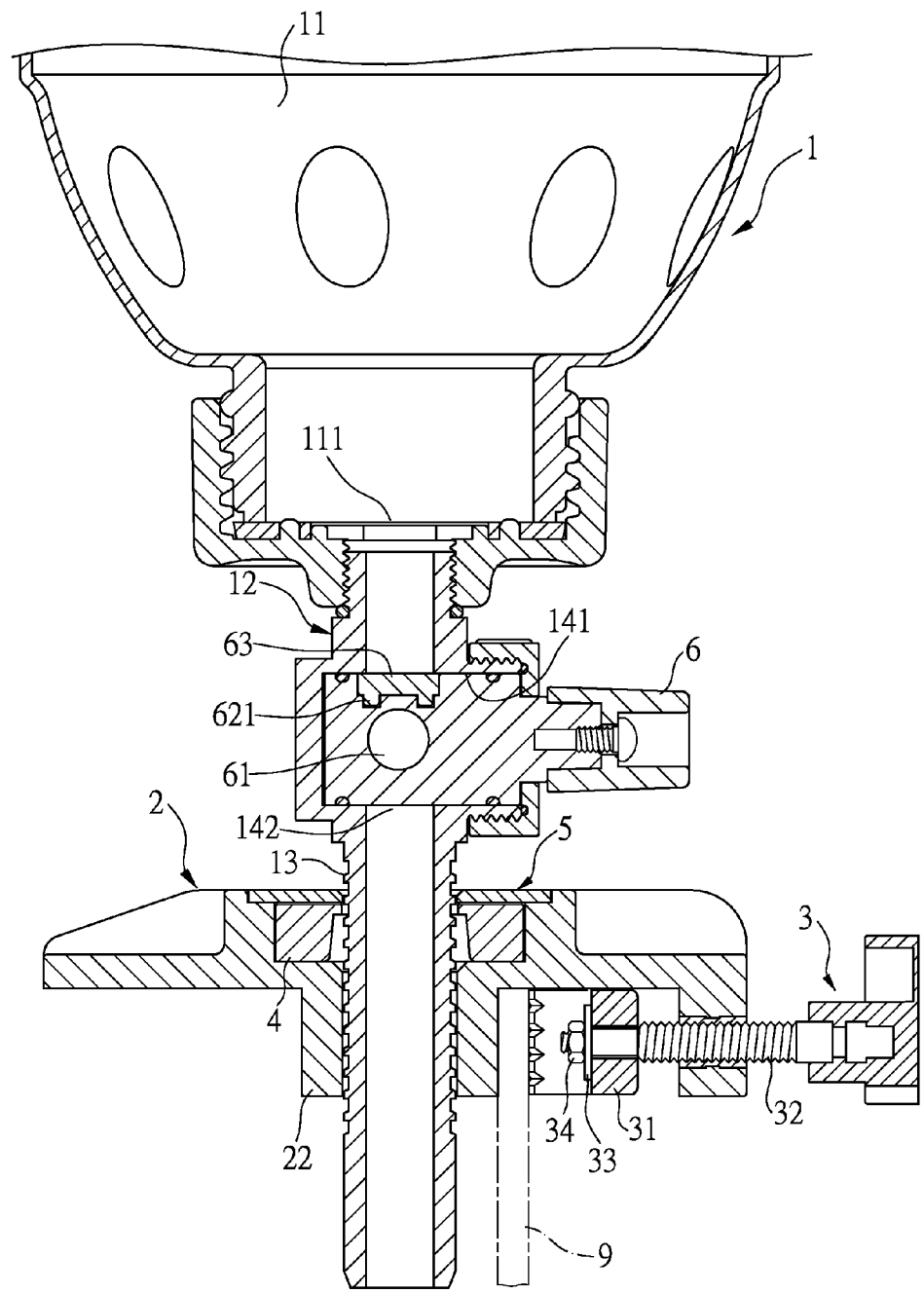
FIG. 4 is a cross sectional view of the oil supply unit of the present invention, wherein the valve is rotated to shut off the communication between the reservoir and the outlet tube.

A connection tube 14 is transversely connected to the outlet tube 12 and has an axial recess 141 and a radial hole 142. The radial hole 142 communicates with the reservoir 11 and the outlet tube 12. A valve 6 is rotatably inserted in the axial recess 141 and has a connection hole 61 and a dent 62 defined in the outer periphery thereof. A pad 63 is resiliently located in the dent 62. The pad 63 is a circular pad and has two studs 631 on the inner side thereof. The dent 62 has two circular holes 621 in which the two studs 631 are inserted. When the connection hole 61 is moved to a position to communicate with the radial hole 142, the reservoir 11 communicates with the outlet tube 12 via the valve 6 as shown in FIG. 3. When the pad 63 is moved to a position to face the radial hole 142, the reservoir 11 is shut off from the outlet tube 12 as shown in FIG. 4.

The connection section 13 of the outlet tube 12 is positioned by the board 4 so that the reservoir 11 is stably located on the base 2. The securing unit 3 extends through the extension portion 23 of the base 2 and is cooperated with the clamp member 31 to clamp an object 9 such as the wall of the brake oil pump or the clutch oil pump, between the tubular portion 22 and the clamp member 31 of the securing unit 3. The brake oil or the clutch oil can be supplied stably by securely positioning the oil supply unit 1 to the object 9.

While we have shown and described the embodiment in accordance with the present invention, it should be clear to those skilled in the art that further embodiments may be made without departing from the scope of the present invention.

What is claimed is:

1. An oil supply unit comprising:

a reservoir and an outlet tube which has one end connected to an outlet of the reservoir, the outlet tube having a connection section;

a base having a recessed area defined in a top thereof, a tubular portion extending from a bottom of the base and located corresponding to the recessed area, the recessed area having a passage which communicates with the tubular portion, the outlet tube extending through the passage and the tubular portion, the base being movably relative to the outlet tube;

a securing unit extending through the base and located corresponding to the tubular portion, the securing unit being movable relative to the outlet tube, and a board connected to the base and having a pass hole through which the outlet tube extends, at least one spring biased between a first end of the board and one of inside walls of the recessed area.

2. The oil supply unit as claimed in claim 1, wherein the recessed area has an opening defined through another one of the inside walls of the recessed area so as to form two stops located at two ends of the opening, the board is located in the recessed area and having two recesses defined in two sides thereof, the two stops are movably engaged with the two recesses of the board so as to restrict the board from passing through the opening, a press end extends from a second end of the board and protrudes beyond the opening, the board is movable in the recessed area by pressing the press end toward the recessed area.

3. The oil supply unit as claimed in claim 2, wherein an extension portion extends from one end of the base and is parallel to the outlet tube, the extension portion has a threaded hole, the securing unit has a clamp member and a threaded rod, the clamp member is located between the tubular portion and the extension portion, the threaded rod threadedly extends through the threaded hole and is pivotably connected to the clamp member, a head is connected to a distal end of the threaded rod and located on outside of the extension portion, a distance between the clamp member and the tubular portion is adjusted by rotating the head.

4. The oil supply unit as claimed in claim 3, wherein a connection tube is transversely connected to the outlet tube and has an axial recess and a radial hole, the radial hole communicates with the reservoir and the outlet tube, a valve is rotatably inserted in the axial recess and has a connection hole and a dent defined in an outer periphery thereof, a pad is resiliently located in the dent, when the connection hole is moved to a position to communicate with the radial hole, the reservoir communicates with the outlet tube via the valve, when the pad is moved to a position to face the radial hole, the reservoir is shut off from the outlet tube.

5. The oil supply unit as claimed in claim 4, wherein the pad is a circular pad and has two studs on an inner side thereof, the dent has two circular holes in which the two studs are inserted.

6. The oil supply unit as claimed in claim 1, wherein an outer periphery of the connection section of the outlet tube has multiple ridges and grooves defined alternatively to each other, a flange extends inward from an inner periphery of the pass hole of the board, the flange is engaged with the grooves.

7. The oil supply unit as claimed in claim 1, wherein the recessed area has multiple notches, a cover is mounted to the recessed area and has a circular hole through which the outlet tube extends, the cover has multiple ribs which are engaged with the notches.

8. The oil supply unit as claimed in claim 6, wherein the recessed area has multiple notches, a cover is mounted to the recessed area and has a circular hole through which the outlet tube extends, the cover has multiple ribs which are engaged with the notches.

* * * * *